(No Model.) 2 Sheets—Sheet 1.
C. T. MITCHELL.
MACHINE FOR MANUFACTURING BEADS, BALLS, &c.
No. 599,108. Patented Feb. 15, 1898.
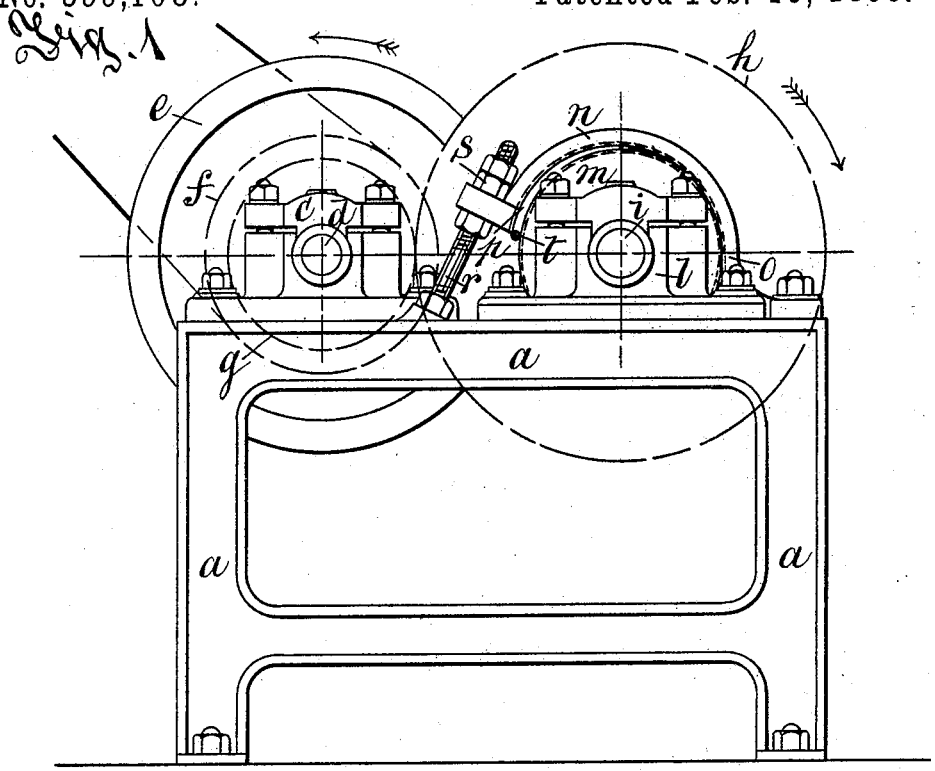
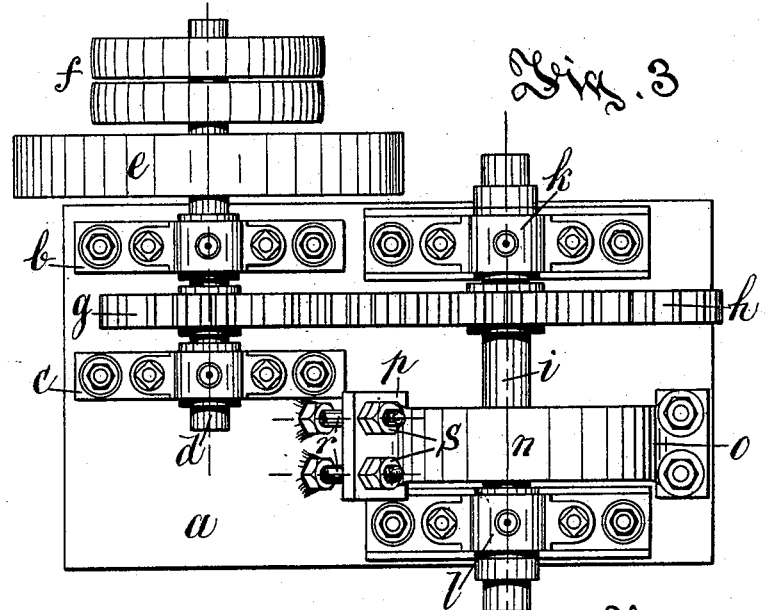
Witnesses:
Inventor:
Charles Thomas Mitchell
by Richards (No Model.) 2 Sheets—Sheet 2.
C. T. MITCHELL.
MACHINE FOR MANUFACTURING BEADS, BALLS, &c.
No. 599,108. Patented Feb. 15, 1898.
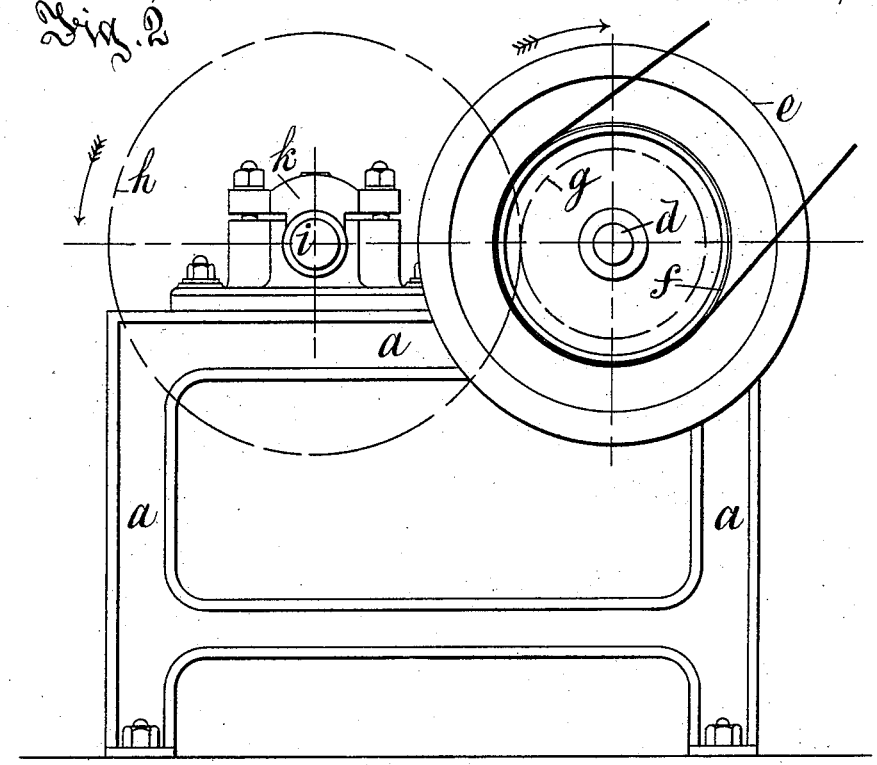
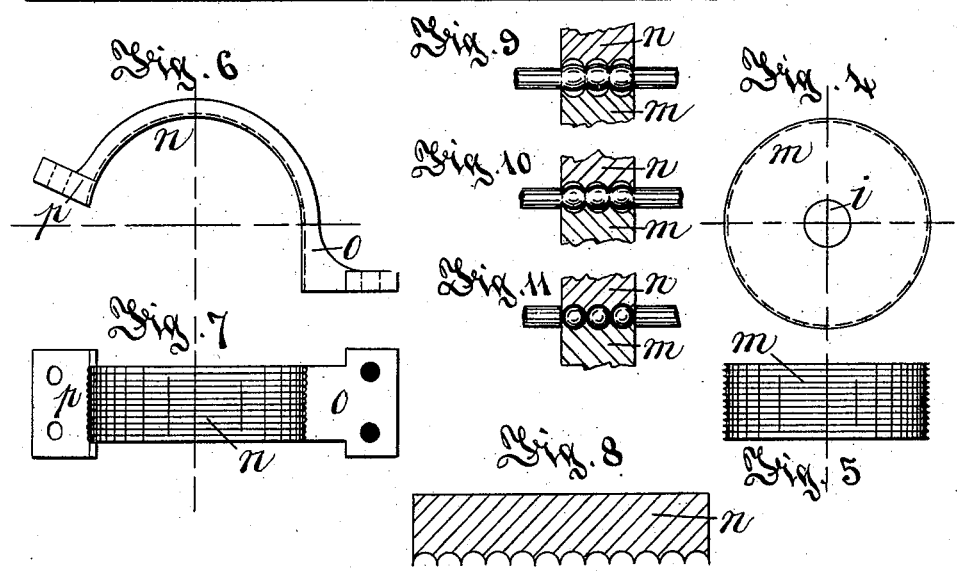
Witnesses:
Otto Munk
W. M. Hopping
Inventor:
Charles Thomas Mitchell
by Richardson
Atty s

UNITED STATES PATENT OFFICE.

CHARLES THOMAS MITCHELL, OF KING'S NORTON, ENGLAND.

MACHINE FOR MANUFACTURING BEADS, BALLS, &c.

SPECIFICATION forming part of Letters Patent No. 599,108, dated February 15, 1898.

Application filed April 10, 1897. Serial No. 631,577. (No model.)

*To all whom it may concern:*

Be it known that I, CHARLES THOMAS MITCHELL, a subject of the Queen of Great Britain, residing at King's Norton, England, have invented a new and useful Improvement in Means for the Manufacture of Beads, Balls, or the Like, of which the following is a specification.

My invention relates to improvements in means for the manufacture of beads, balls, or the like, and more particularly for the manufacture of steel balls such as are used in the bearings of bicycles and for other purposes.

The invention relates to apparatus or devices by means of which (assuming that it is to be applied to the forging or formation by rolling pressure of small steel balls which are afterward finished and polished in the usual way and used in cycle-bearings) a heated steel bar or rod of proper diameter introduced into the machine is formed into a number of spheres which are simultaneously formed and cut off from the bar and delivered from the machine in a proper condition to be finished and polished, the operation described being extremely rapid, and another length of the same heated steel bar or another similar bar being then supplied to the machine to be made into balls, and so on as long as may be desired.

By my present invention the balls are turned out at great speed in very large numbers, a predetermined number (which may be eight, ten, or twelve, more or less) being formed upon and cut off from the bar at each operation, while the machine is simple, inexpensive in first cost and in working, easily used, and not liable to get out of order.

The invention consists in the construction hereinafter described, and particularly pointed out in the appended claim.

The accompanying drawings are in illustration of my invention, Figures 1 and 2 being side views, and Fig. 3 a plan, showing a machine making twelve balls from a heated steel rod at each operation. Figs. 4, 5, 6, 7, 8, 9, 10, and 11 represent detailed views of different parts of the machine.

$a$ is a frame of iron or other suitable material and of sufficient strength. Upon this frame are fixed or formed strong bearings $b$ and $c$, in which revolves a horizontal shaft $d$, provided with a fly-wheel $e$ and shown with fast and loose pulleys at $f$, by which or by other equivalent means the shaft is made to revolve at the desired speed. This shaft drives, preferably by means of a toothed pinion $g$ and wheel $h$, a strong shaft $i$, which revolves in bearings $k$ and $l$ and upon which is firmly fixed a steel wheel, disk, or drum $m$, around the periphery of which are formed any determined number of parallel grooves semicircular in cross-section and having a width equal to the diameter of the steel balls which are to be made by it. These grooves are made as close to each other as possible, their outer edges where any two grooves meet being brought to a sufficiently sharp edge.

Outside and above the grooved steel wheel or drum $m$ is arranged a corresponding segment of a hollow cylinder or ring $n$, preferably extending about half-way around the drum $m$. The segment $n$ is grooved internally, as shown in transverse section upon a larger scale in Fig. 8, with semicircular grooves exactly corresponding with those around the drum $m$, and it is firmly fixed to the frame of the machine at its lower or outer end $o$ in such a position that the grooves on its inside are exactly opposite and adjacent to those around the drum $m$, the sharp edges which divide the adjoining grooves in the segment being as close as possible to those which divide the grooves around the drum, so that each pair of semicircular grooves form at this part a complete circle the diameter of which is the same as that of the balls to be made by the machine. The other end at $p$ of the grooved segment $n$ is raised somewhat from the drum $m$, being adjusted and held firmly in the desired position by strong screwed bolts $r$ and nuts $s$, by which the distance of the part $p$ of the segment $n$ from the drum $m$ can be exactly adjusted and retained, and lateral adjustments may also be provided, if necessary, to keep the grooves in the former exactly opposite those in the latter.

The action of the apparatus is as follows: The position of the segment $n$ being exactly adjusted so that at its end $p$ the grooves around its interior are sufficiently separated from those around the exterior of the drum $m$ to allow a heated steel rod of proper diameter to enter between them when held against them, as shown at $t$ in Fig. 1, in a position parallel with the axis of the drum, and the latter being made to revolve in the direction of the arrow, the heated rod is drawn between the grooves, and as the space between those on the drum and the segment diminishes (toward $o$) the edges between the grooves cut, compress, and form the adjoining part of the bar into a shape approaching spherical, as indicated in Fig. 9. As the grooves continue to approach each other the spherical shape becomes more defined, as indicated in Fig. 10, and finally they are formed into perfect spheres which are separated by the sharp edges between the adjoining grooves, as indicated in Fig. 11, and the finished balls fall out at $o$ from the grooves and are then completed by grinding, polishing, and sizing in the usual way.

An adjustable support may be used to support the heated bar before it is introduced between the grooves. An adjustable stop may also be used to determine its position longitudinally.

As the grooves extend completely around the drum $m$, which is in continuous revolution, the hot bar can be inserted at any part of the circumference, and when it has entered between the grooves it is carried forward by the revolution of the drum and is rolled around as it travels until the operation is finished. If desired, a succession of heated bars can be introduced, so that two or more are being operated upon at the same time, and very large numbers of balls are rapidly made.

The diameter of the bar or rod should be such that a part of its length equal to the diameter of a ball should be of such diameter that such a part shall contain exactly the quantity of material to make a finished ball.

Any desired or suitable number of parallel grooves may be used, and there is no waste of the steel or other material used for making the balls.

It is evident that by suitably modifying the shape of the grooves around the revolving drum and inside the fixed segment articles of other shape as well as spherical balls may be made.

I do not confine myself to the precise details of form and arrangement or the proportion of the several parts; but

What I claim as my invention, and desire to secure by Letters Patent, is—

In a machine for the manufacture of balls from a cylindrical bar of iron, the combination with the cylinder or drum $m$ having a plurality of semicylindrical grooves, with means for driving said drum, of a stationary segment or concave $n$ having similar semicircular grooves, and means for supporting one end of the concave adjacent to the drum, an offset at the other end, bolts connected to the frame and extending through openings in the offset, and adjusting-nuts carried by said bolts, substantially as described.

In testimony whereof I have hereunto set my hand in the presence of two witnesses.

CHARLES THOMAS MITCHELL.

Witnesses:
 ION ATKINS,
 ROBERT HENRY DYBLE.